US012789832B2

(12) United States Patent
Chan et al.

(10) Patent No.: US 12,789,832 B2
(45) Date of Patent: Nov. 10, 2026

(54) VEHICLE ADAS NOTIFICATION MUTING

(71) Applicant: Oshkosh Corporation, Oshkosh, WI (US)

(72) Inventors: Brendan Chan, Oshkosh, WI (US); Amanda Miller, Oshkosh, WI (US); Jon Zeamer, Oshkosh, WI (US); Justin Neils, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 19/213,964

(22) Filed: May 20, 2025

(65) Prior Publication Data

US 2025/0276713 A1 Sep. 4, 2025

Related U.S. Application Data

(63) Continuation of application No. 18/111,116, filed on Feb. 17, 2023, now abandoned.

(60) Provisional application No. 63/325,943, filed on Mar. 31, 2022.

(51) Int. Cl.
*B60W 50/14* (2020.01)
*B66F 9/075* (2006.01)

(52) U.S. Cl.
CPC ........... *B60W 50/14* (2013.01); *B66F 9/0755* (2013.01); *B60W 2050/143* (2013.01); *B60W 2050/146* (2013.01); *B60W 2420/403* (2013.01); *B60W 2420/408* (2024.01); *B60W 2554/4041* (2020.02); *B60W 2554/80* (2020.02)

(58) Field of Classification Search
CPC ........... B60W 50/14; B60W 2050/143; B60W 2050/146; B60W 2420/403; B60W 2420/408; B60W 2554/4041; B60W 2554/80; B60W 2300/12; B66F 9/0755; B66F 11/04; B66F 17/006; G01S 7/412; G01S 13/867; G01S 2013/93271; G01S 2013/93272; G01S 2013/93274; G01S 13/931; G06V 20/56
USPC ........................................................ 340/425.5
See application file for complete search history.

(56) References Cited

U.S. PATENT DOCUMENTS

| | | | | |
|---|---|---|---|---|
| 9,849,988 B2 * | 12/2017 | Carles | ................ | B64D 11/0626 |
| 10,157,264 B2 * | 12/2018 | Nguyen | ................. | G16H 10/60 |
| 11,420,750 B2 * | 8/2022 | Dowty | ............... | B64D 11/0602 |
| 2006/0060704 A1 * | 3/2006 | Lavie | ..................... | A61G 3/001 244/118.5 |

(Continued)

*Primary Examiner* — Omar Casillashernandez
(74) *Attorney, Agent, or Firm* — Foley & Lardner LLP

(57) ABSTRACT

A vehicle system including a vehicle including a chassis, a body assembly coupled to the chassis, a prime mover configured to generate mechanical energy to drive the vehicle, a lift assembly; and a vehicle control system including a sensor integrated into the body assembly. The vehicle control system is configured to receive sensor data from the sensor. The sensor data indicates a potential event. The vehicle control system is further configured to generate a notification associated with the potential event, receive control data indicating a state of the refuse vehicle, filter the sensor data through the control data to determine if the potential event is a false event associated with the state of the refuse vehicle or a true event associated with an external source, and mask the notification in response to a determination that the potential event is a false event.

17 Claims, 17 Drawing Sheets

(56) References Cited

U.S. PATENT DOCUMENTS

| | | | | |
|---|---|---|---|---|
| 2013/0262139 | A1* | 10/2013 | Salahuddin | G16H 10/60<br>705/2 |
| 2016/0051146 | A1* | 2/2016 | Eaton | G16H 40/20<br>340/870.07 |
| 2023/0024865 | A1* | 1/2023 | Guy | A61B 5/6887 |

* cited by examiner

VEHICLE ADAS NOTIFICATION MUTING

CROSS-REFERENCE TO RELATED APPLICATIONS

This application is a continuation of U.S. patent application Ser. No. 18/111,116, filed Feb. 17, 2023, which claims the benefit of and priority to U.S. Provisional Application No. 63/325,943, filed on Mar. 31, 2022, the entire contents of each of which are hereby incorporated by reference herein.

BACKGROUND

The present disclosure relates generally to vehicles. More specifically, the present disclosure relates to advanced driver assistance systems (ADAS) for vehicles.

SUMMARY

An embodiment relates to a system. The system includes a vehicle having a chassis, a body assembly coupled to the chassis, a prime mover configured to generate mechanical energy to drive the vehicle, a lift assembly, and a vehicle control system including a sensor integrated into the body assembly. The vehicle control system is configured to receive sensor data from the sensor. The sensor data can indicate a potential event. The vehicle control system is further configured to generate a notification associated with the potential event, receive control data indicating a state of the refuse vehicle, filter the sensor data through the control data to determine if the potential event is a false event associated with the state of the refuse vehicle or a true event associated with an external source, and silence the notification in response to a determination that the potential event is a false event.

An embodiment relates to a method. The method may be performed by a vehicle control system. The method includes receiving, sensor data indicating a potential event from a sensor, wherein the sensor is integrated into a body assembly coupled to a chassis of an vehicle comprising a prime mover configured to generate mechanical energy to drive the vehicle; and a lift assembly. The method includes generating a notification associated with the potential event. The method includes receiving control data indicating a state of the vehicle. The method includes filtering the sensor data through the control data to determine if the potential event is a false event associated with the state of the vehicle or a true event associated with an external source. The method includes masking the notification in response to a determination that the potential event is the false event.

An embodiment relates to a non-transitory computer-readable media. The computer-readable media includes instructions to receive sensor data indicating a potential event from a sensor; generate a notification associated with the potential event; receive control data indicating a state of a vehicle; filter the sensor data through the control data to determine if the potential event is a false event associated with the state of the vehicle or a true event associated with an external source; initiate a control action in response to the potential event, wherein the control action provides the notification to a user of the vehicle responsive to a determination that the potential event is the true event; and mask the notification in response to a determination that the potential event is the false event.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

In some ADAS systems, audio and visual notifications are provided whenever an external object or obstacle is detected near the vehicle. However, in many systems, there are both visual and audio notifications whenever a portion of the vehicle extends outward to perform a function (e.g., arm and/or grabber, extension, tailgate lift, etc.), which are a nuisance to the driver. In many cases, this is because there is no way of distinguishing between a movement and/or presence of a portion of the vehicle and an external object or obstacle. Accordingly, there is a need to mask such notifications when the vehicle performs a function that is known to otherwise provide a notification.

According to an exemplary embodiment, a vehicle (e.g., refuse truck, mixer vehicle, fire fighting vehicle, etc.) includes a vehicle control system configured to operate as an advanced driver-assistance system (ADAS). The ADAS system includes one or more sensors positioned in and around the vocational vehicle. In one embodiment, the sensors include a three hundred sixty degree camera system and a three hundred sixty degree radar system.

Overall Vehicle

Figure 1:
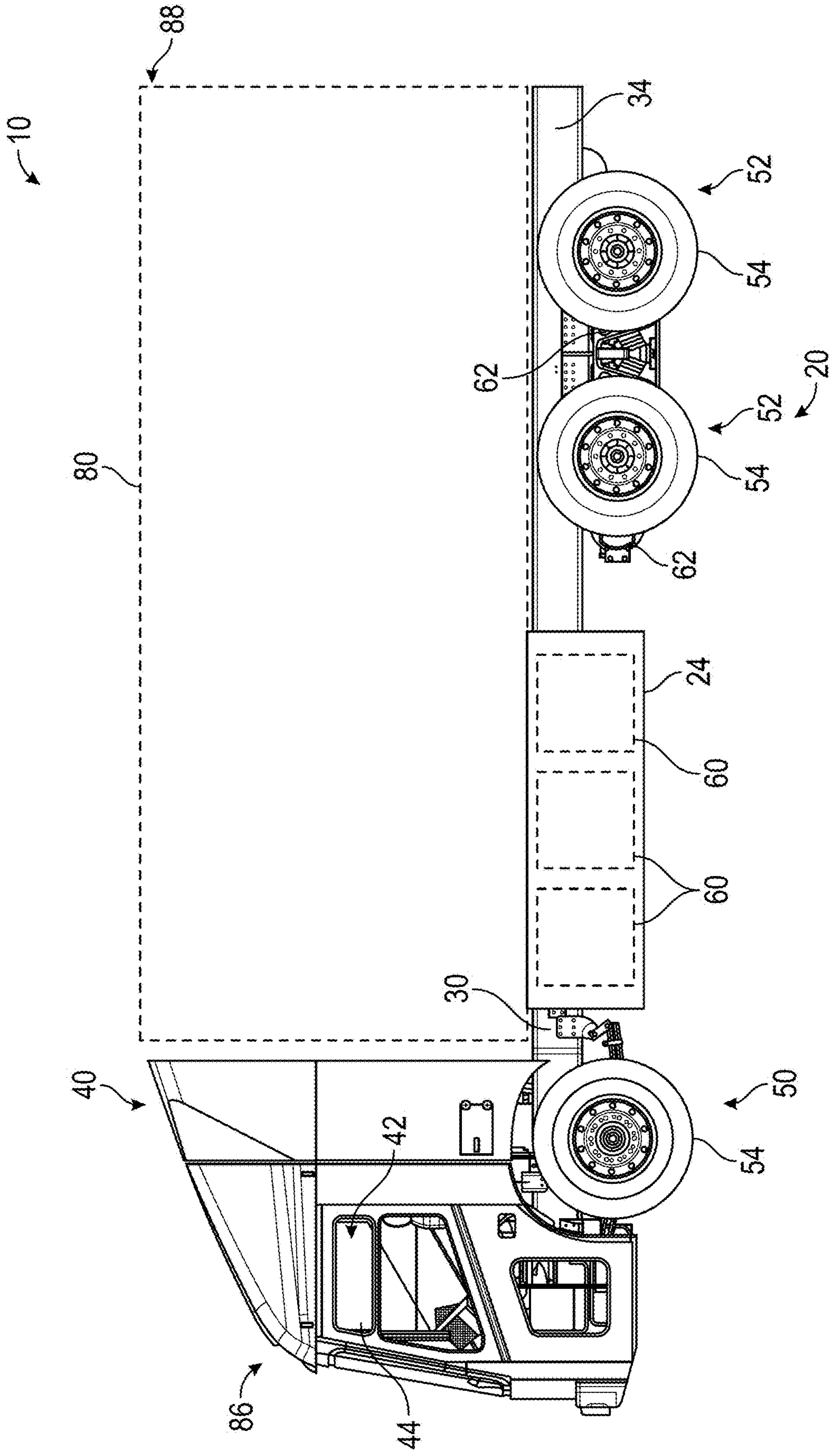
FIG. 1 is a left side view of a vehicle, according to an exemplary embodiment.
Figure 2:
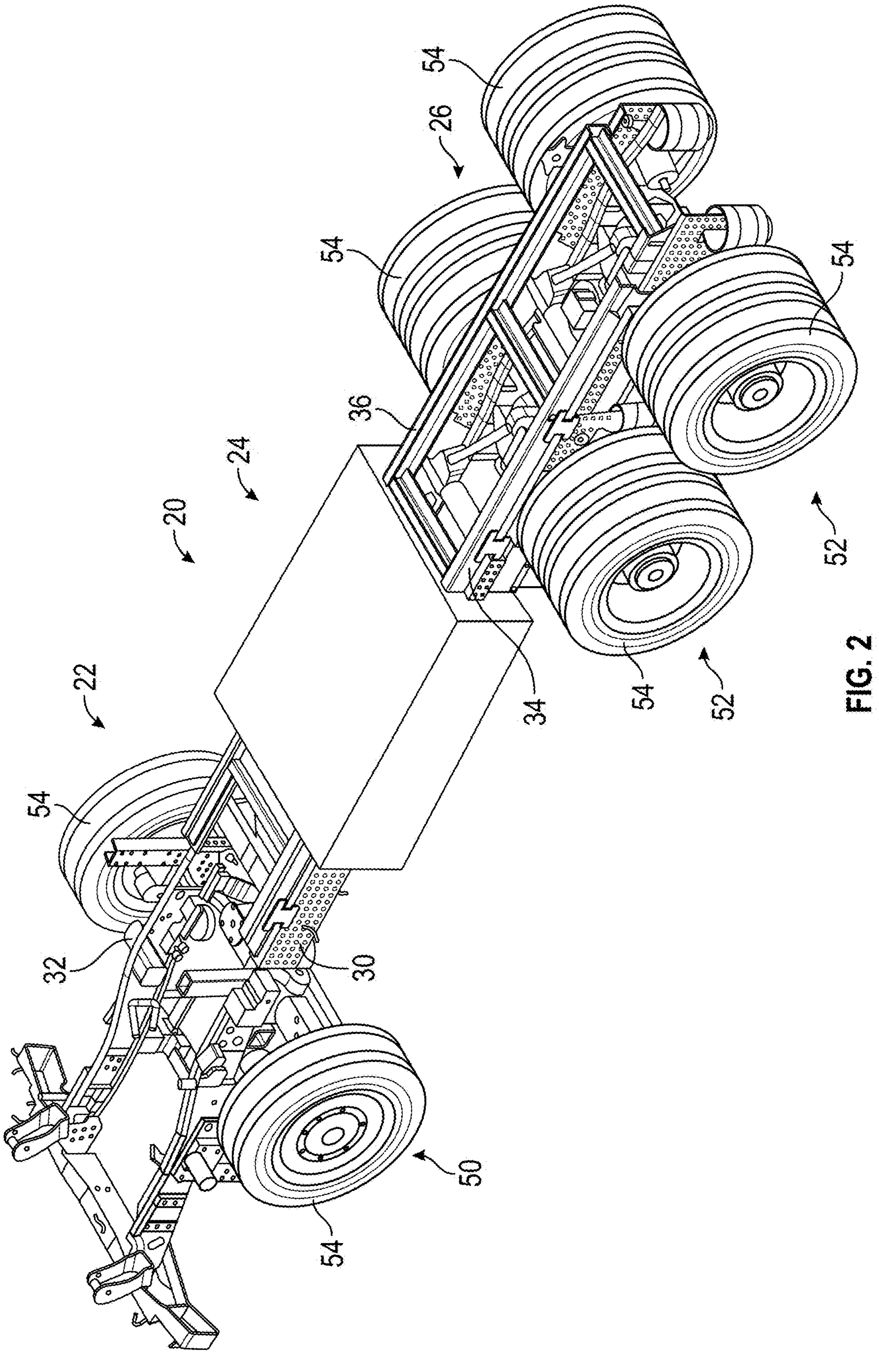
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 54 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown. Further, references to embodiments employing a particular type of vehicle 10 may employ other types of vehicles. For example, references to an ADAS of a refuse vehicle 10 detecting a portion of the vehicle is not intended to be limiting; other embodiments may employ a concrete truck, firefighting vehicle, sedan, or the like.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
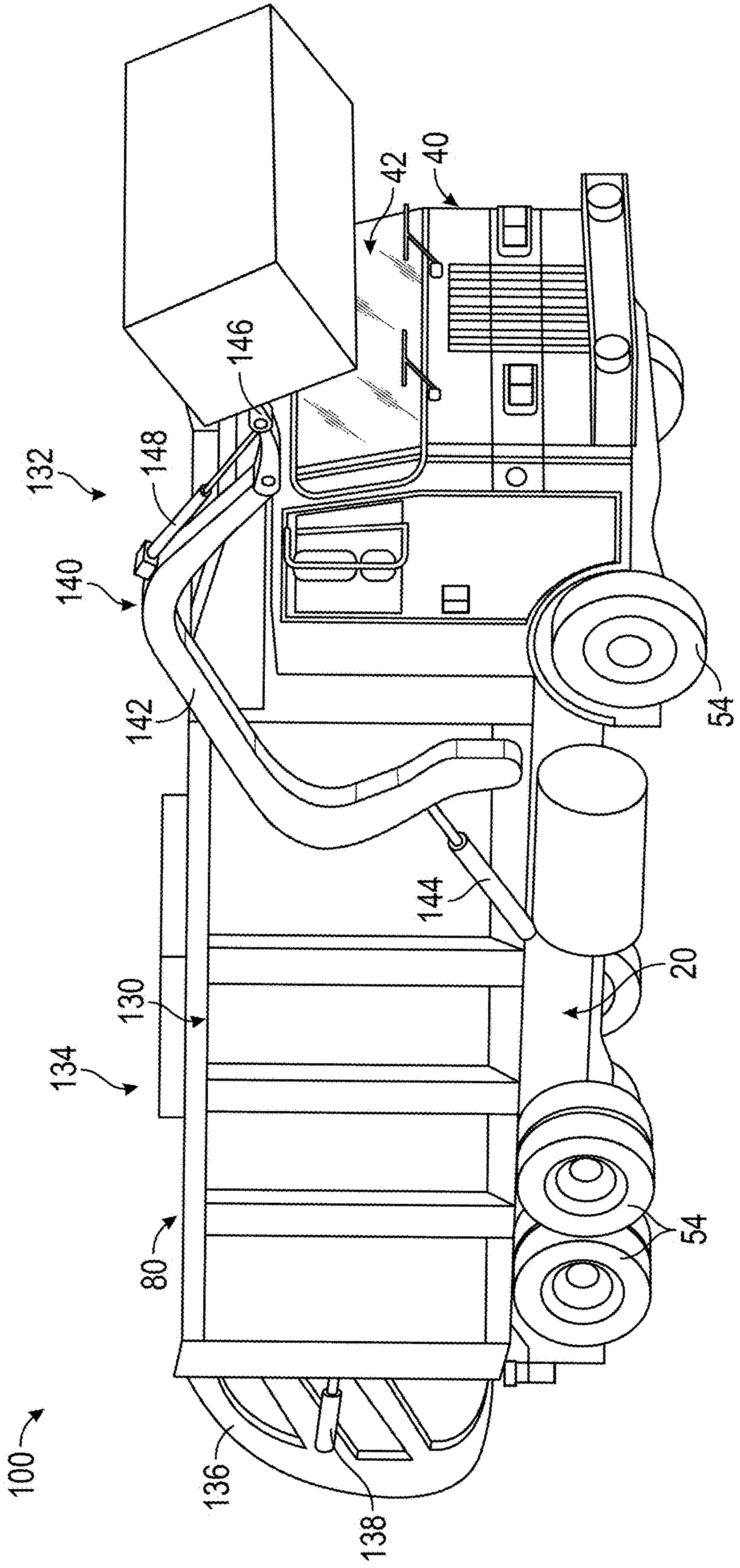
FIG. 3 is a perspective view of the vehicle of FIG. 1 configured as a front-loading refuse vehicle, according to an exemplary embodiment.
Figure 4:
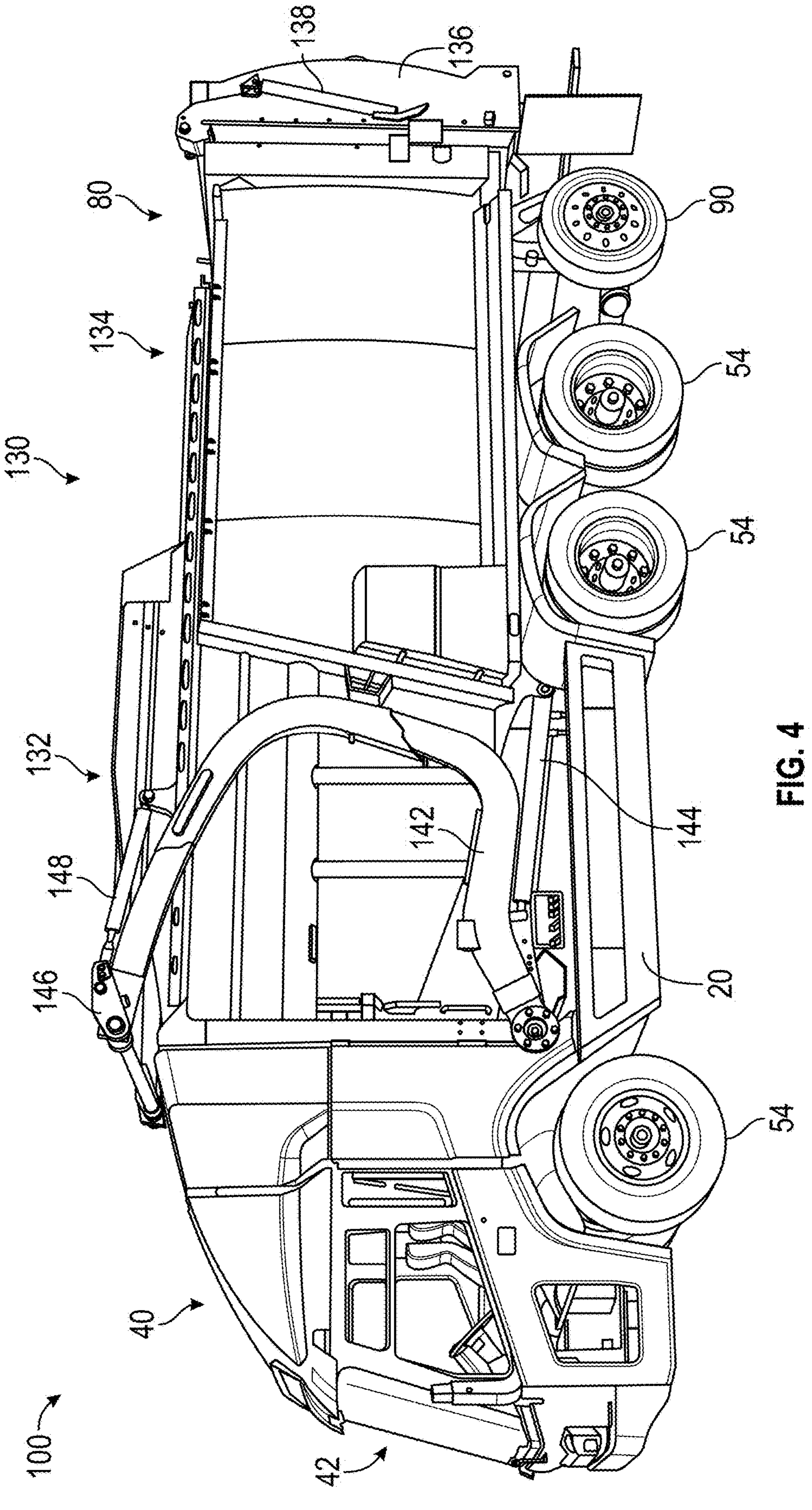
FIG. 4 is a left side view of the front-loading refuse vehicle of FIG. 3 configured with a tag axle, according to an exemplary embodiment.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively coupled the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 5:
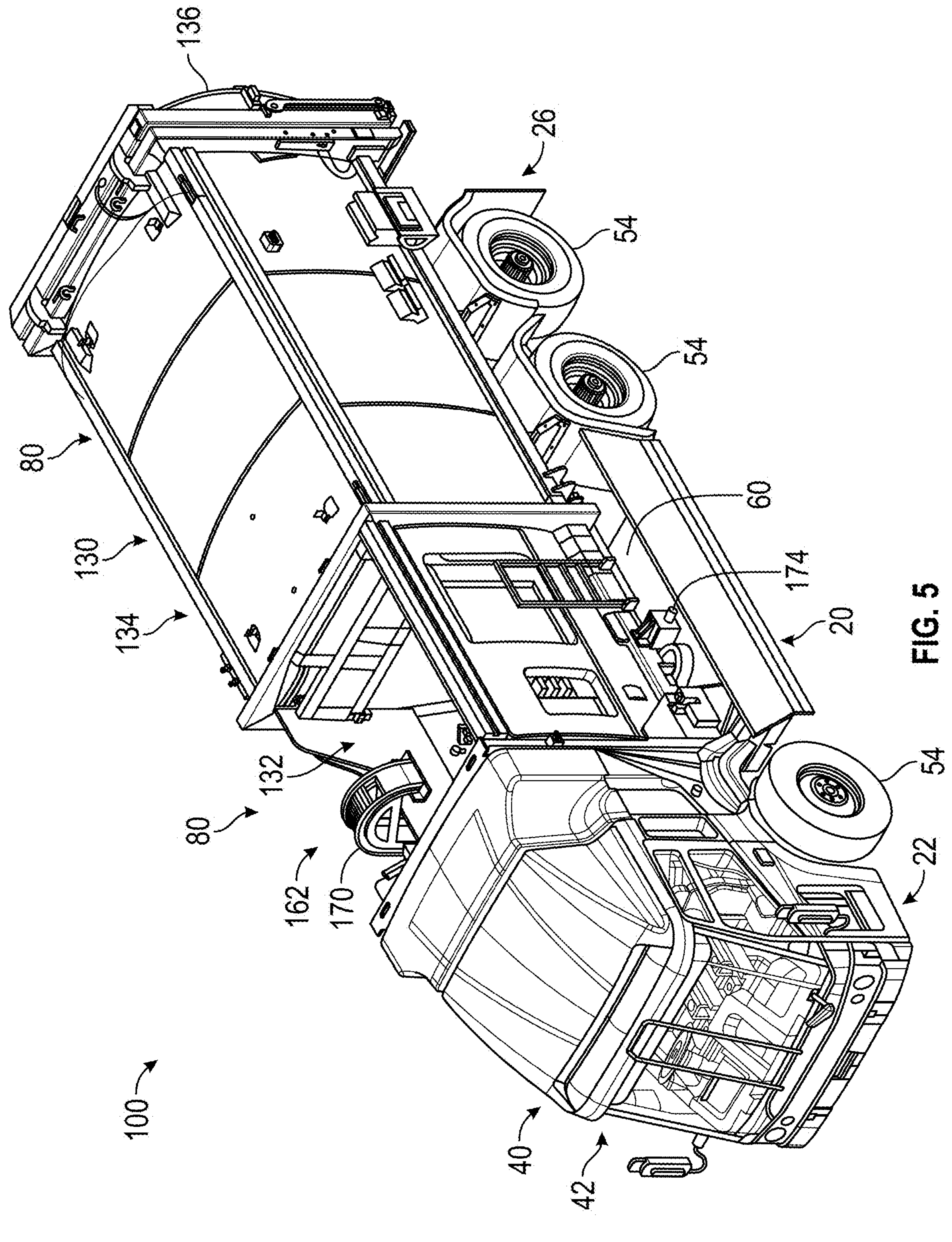
FIG. 5 is a perspective view of the vehicle of FIG. 1 configured as a side-loading refuse vehicle, according to an exemplary embodiment.
Figure 6:
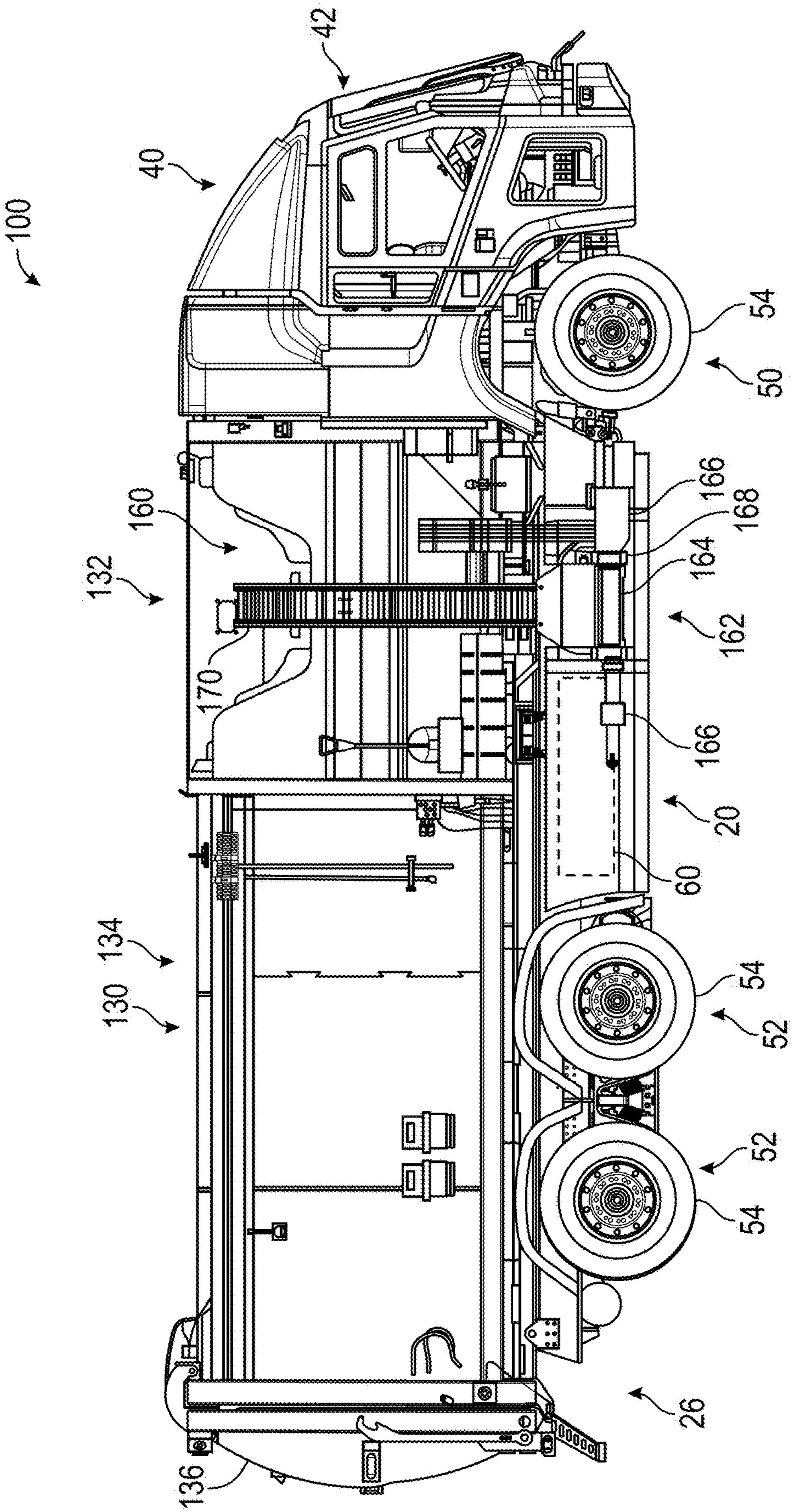
FIG. 6 is a right side view of the side-loading refuse vehicle of FIG. 5, according to an exemplary embodiment.
Figure 7:
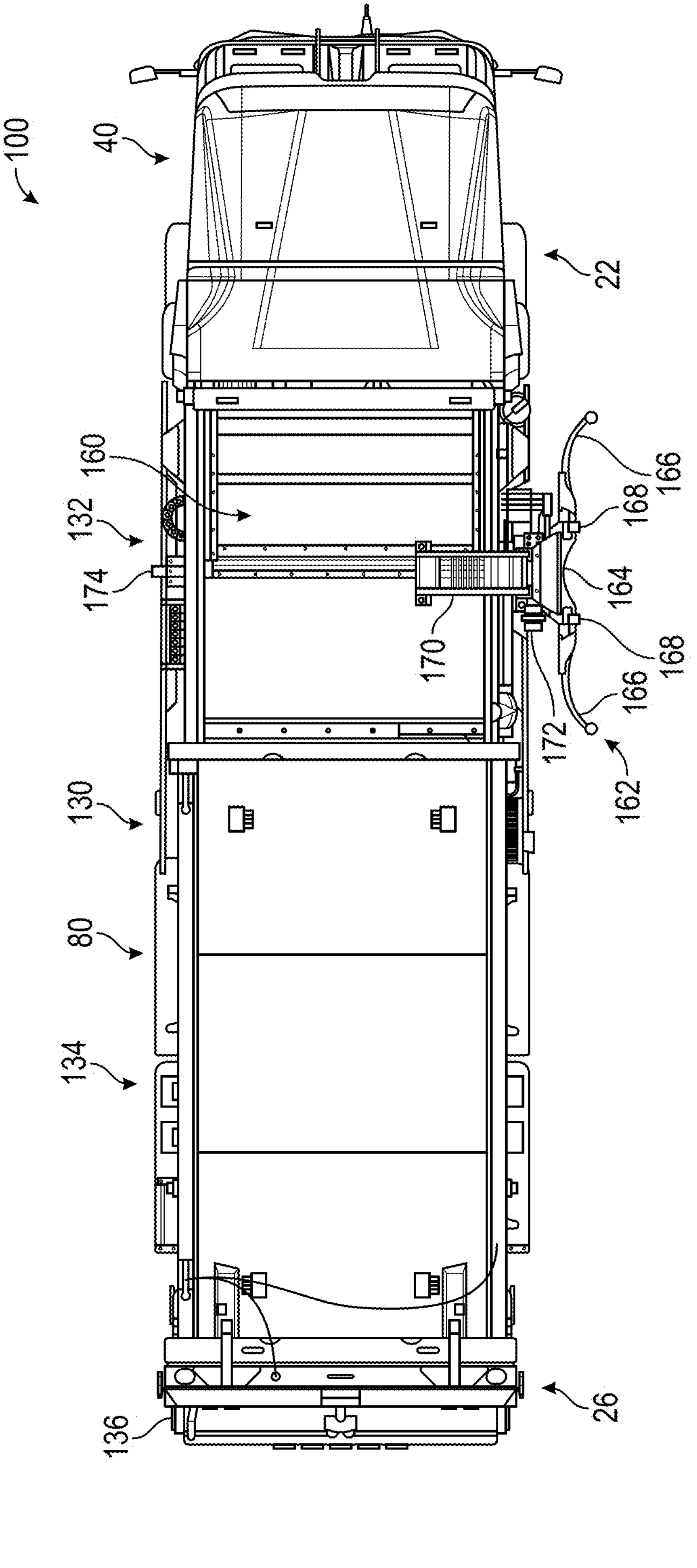
FIG. 7 is a top view of the side-loading refuse vehicle of FIG. 5, according to an exemplary embodiment.
Figure 8:
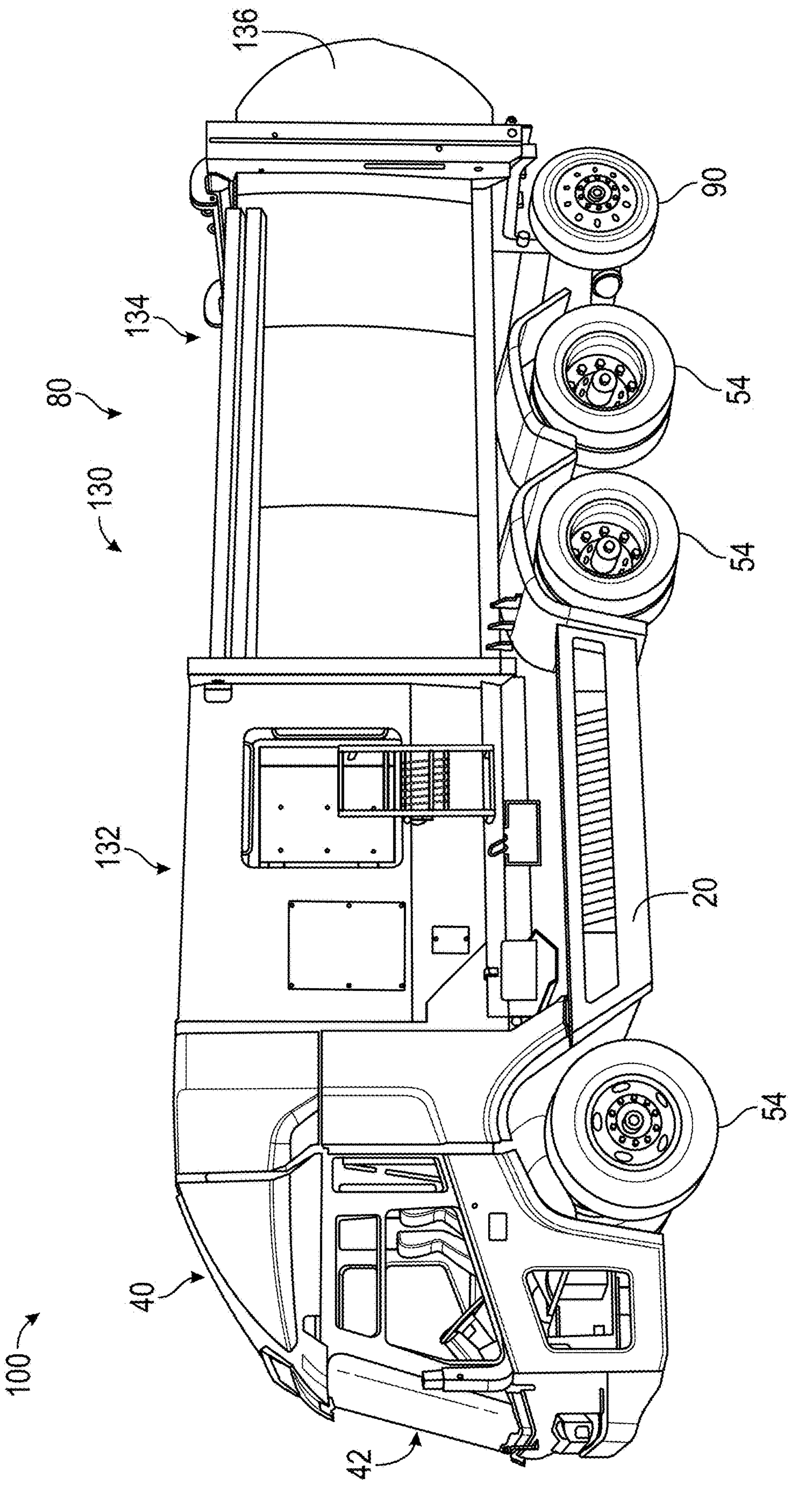
FIG. 8 is a left side view of the side-loading refuse vehicle of FIG. 5 configured with a tag axle, according to an exemplary embodiment.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown, the refuse vehicle 100 of FIGS. 5-7 is configured with a tag axle 90 in FIG. 8.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
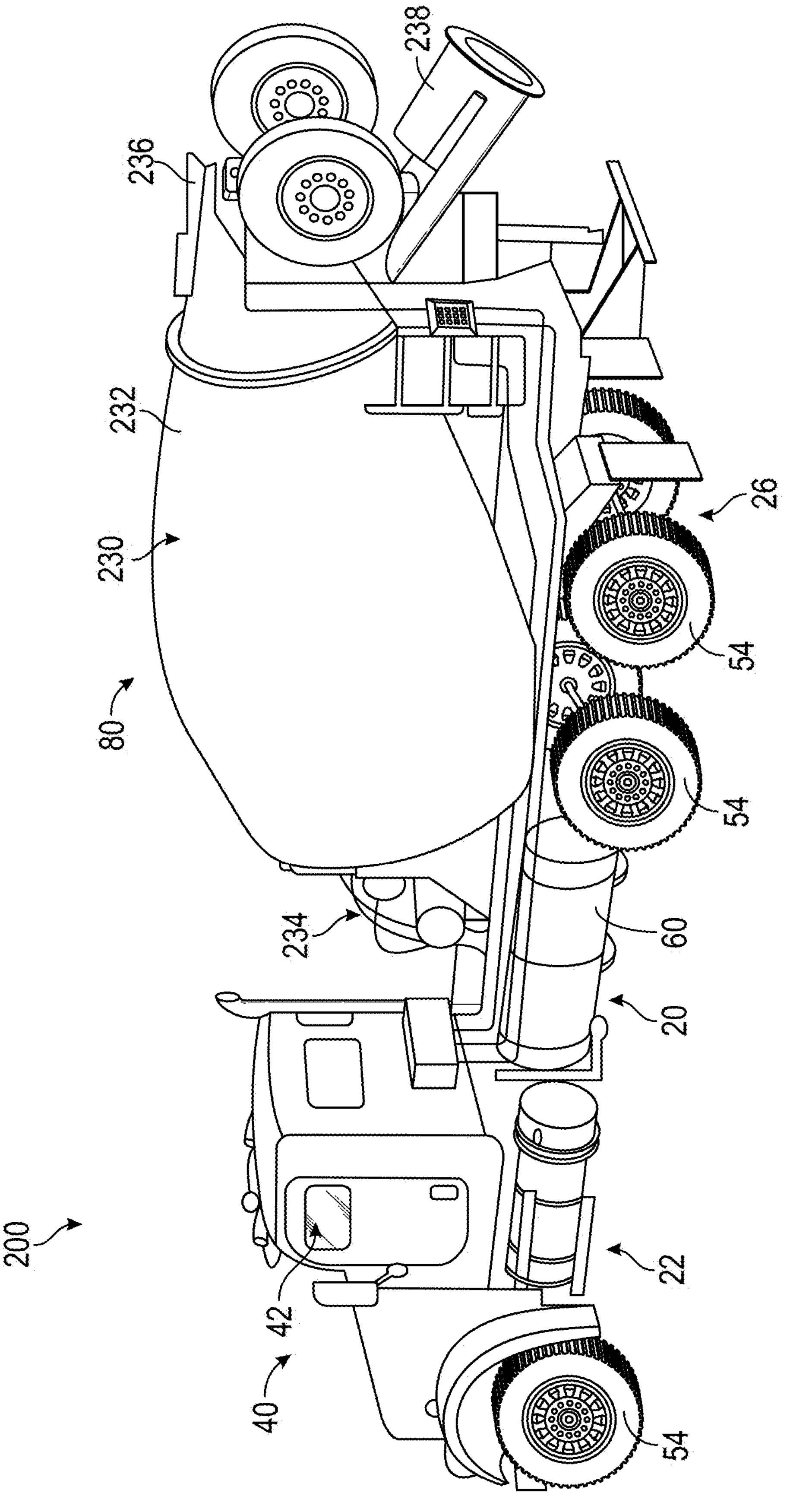
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plan extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
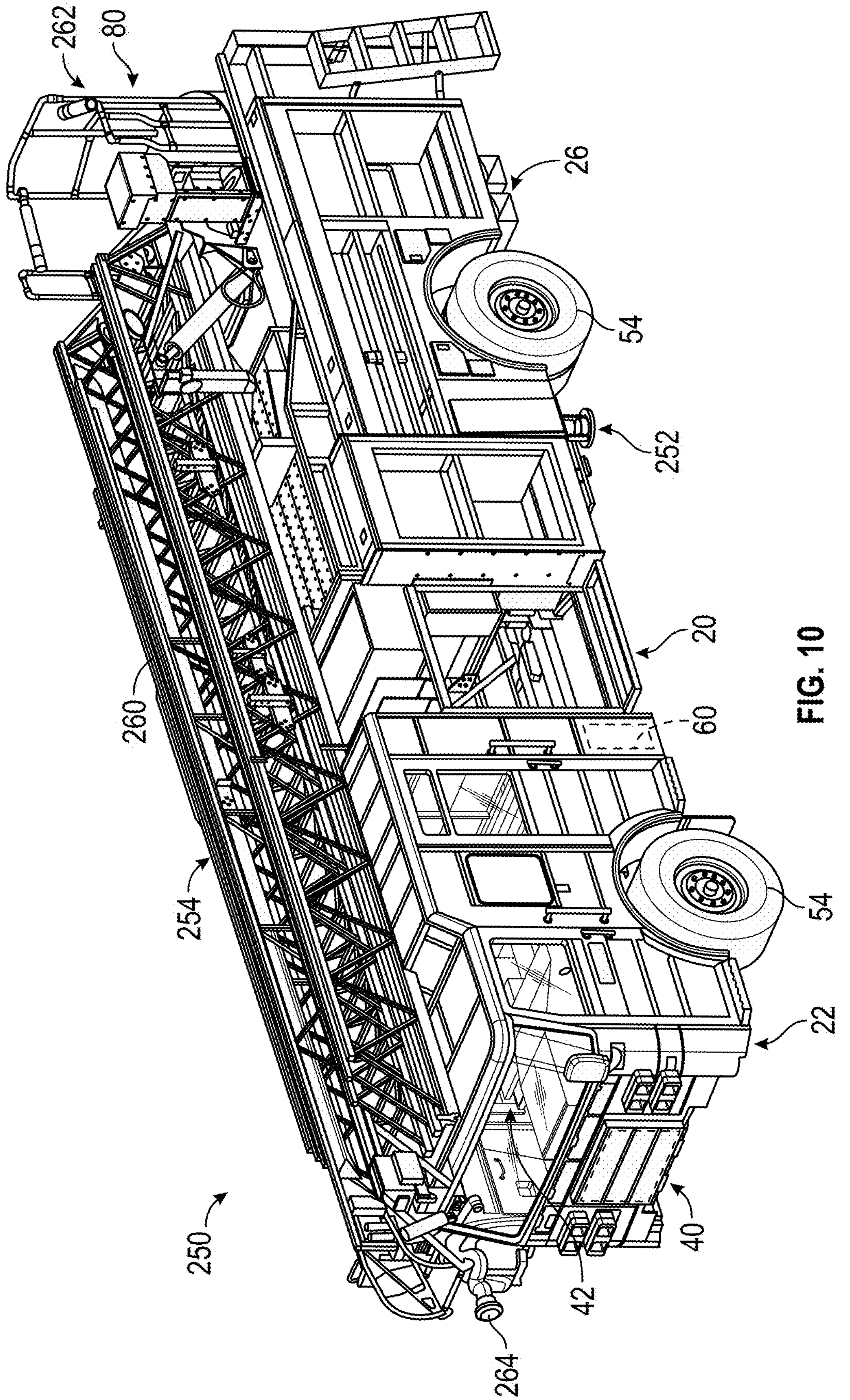
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
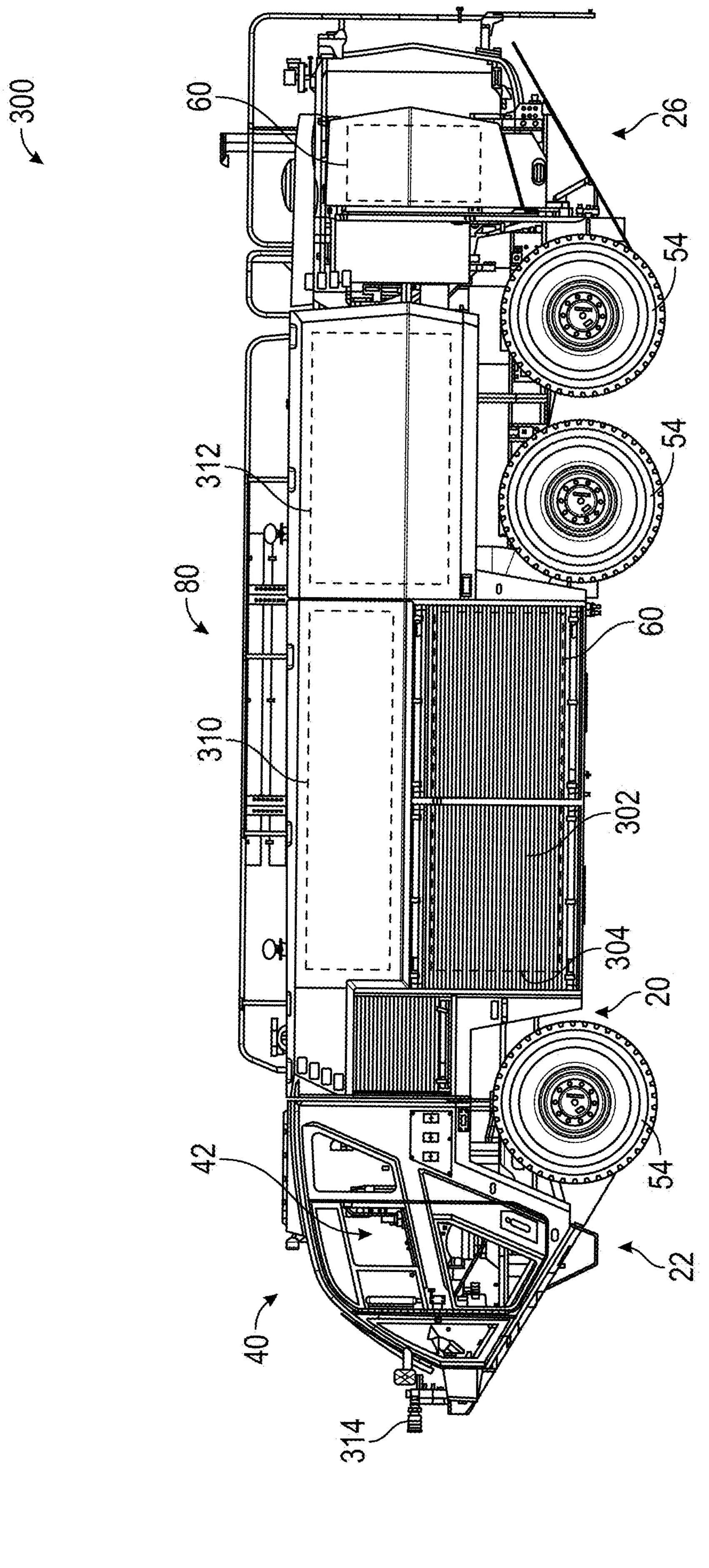
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
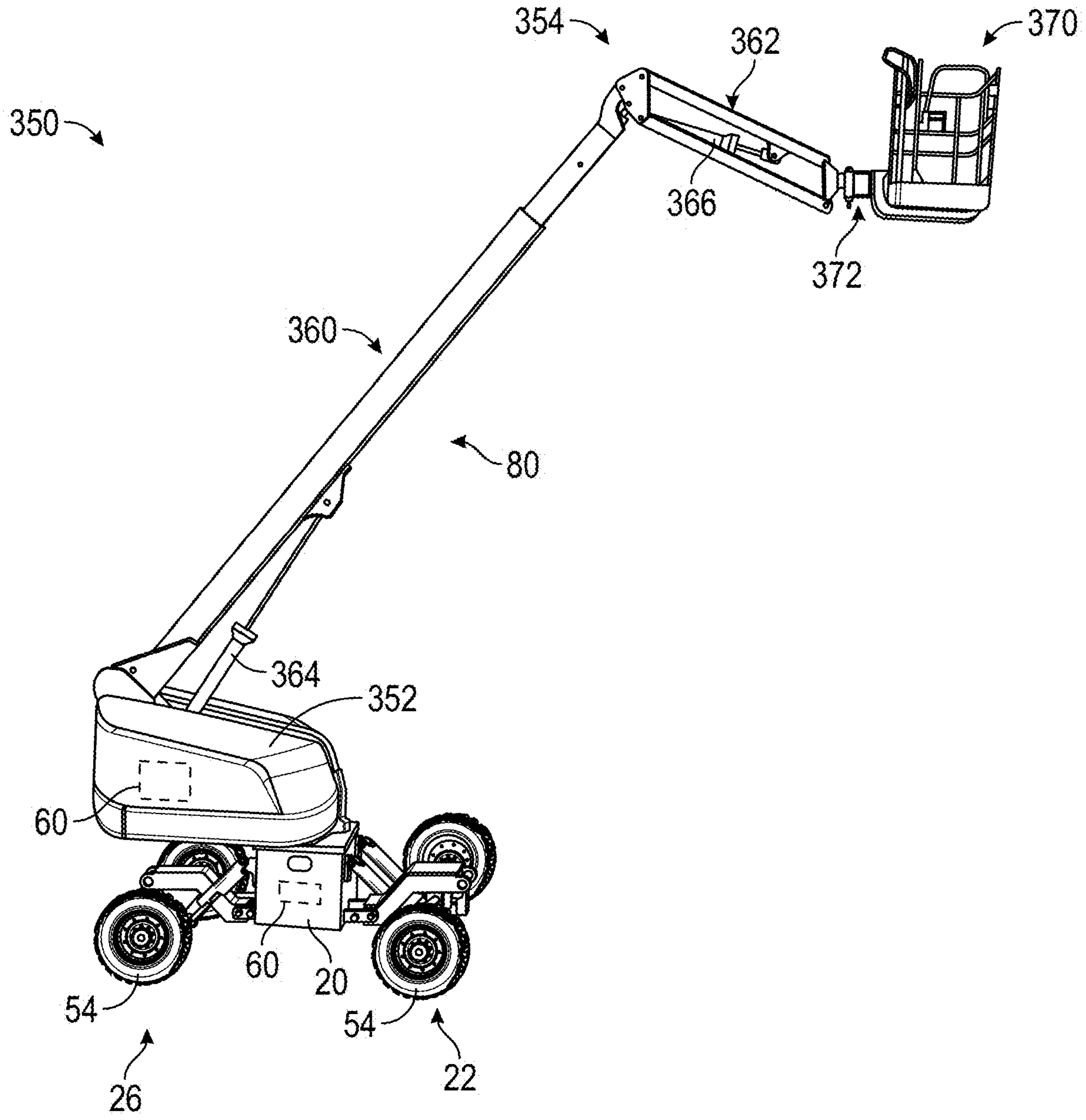
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
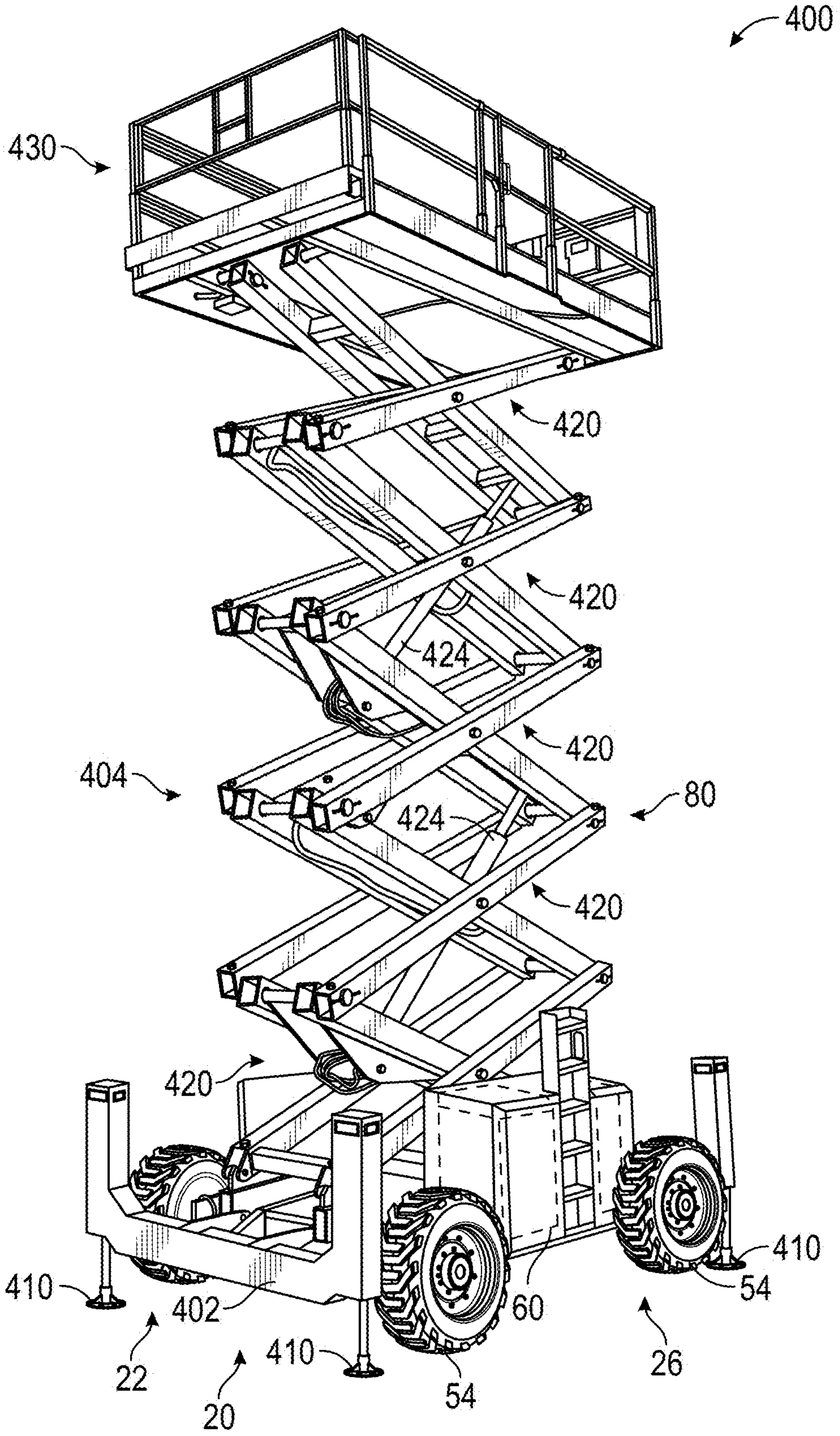
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as cab 404, such that the lift base 402 supports the cab 404. The cab 404 is configured to extend and retract, raising and lowering between a raised position and a lowered position relative to the lift base 402.

As shown in FIG. 13, the lift base 402 includes a series of actuators, stabilizers, downriggers, or outriggers, shown as lift assembly 140. The lift assembly 140 may extend and retract vertically between a stored position and a deployed position. In the stored position, the lift assembly 140 may be raised, such that the lift assembly 140 do not contact the ground. Conversely, in the deployed position, the lift assembly 140 may engage the ground to lift the lift base 402. The length of each of the lift assembly 140 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the lift assembly 140 in their respective deployed positions may be adjusted to level the lift base 402 with respect to the direction of gravity (e.g., on uneven, sloped, pitted, etc. terrain). The lift assembly 140 may lift the wheel and tire assemblies 54 off of the ground to prevent movement of the scissor lift 400 during operation. In other embodiments, the lift assembly 140 are omitted.

The cab 404 may include a series of subassemblies, shown as scissor layers 420, each including a pair of inner members and a pair of outer members pivotally coupled to one another. The scissor layers 420 may be stacked atop one another in order to form the cab 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the cab 404 in order to increase, or decrease, the fully extended height of the cab 404.

Referring still to FIG. 13, the cab 404 may also include one or more lift actuators 424 (e.g., hydraulic cylinders, pneumatic cylinders, electric linear actuators such as motor-driven leadscrews, etc.) configured to extend and retract the cab 404. The lift actuators 424 may be pivotally coupled to inner members of various scissor layers 420, or otherwise arranged within the cab 404.

A distal or upper end of the cab 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the cab 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the cab 404), and retraction of the lift actuators 424 moves the platform assembly 430 downward (e.g., retracting the cab 404). In other embodiments, extension of the lift actuators 424 retracts the cab 404, and retraction of the lift actuators 424 extends the cab 404.

External Object ADAS Notifications

Figure 14:
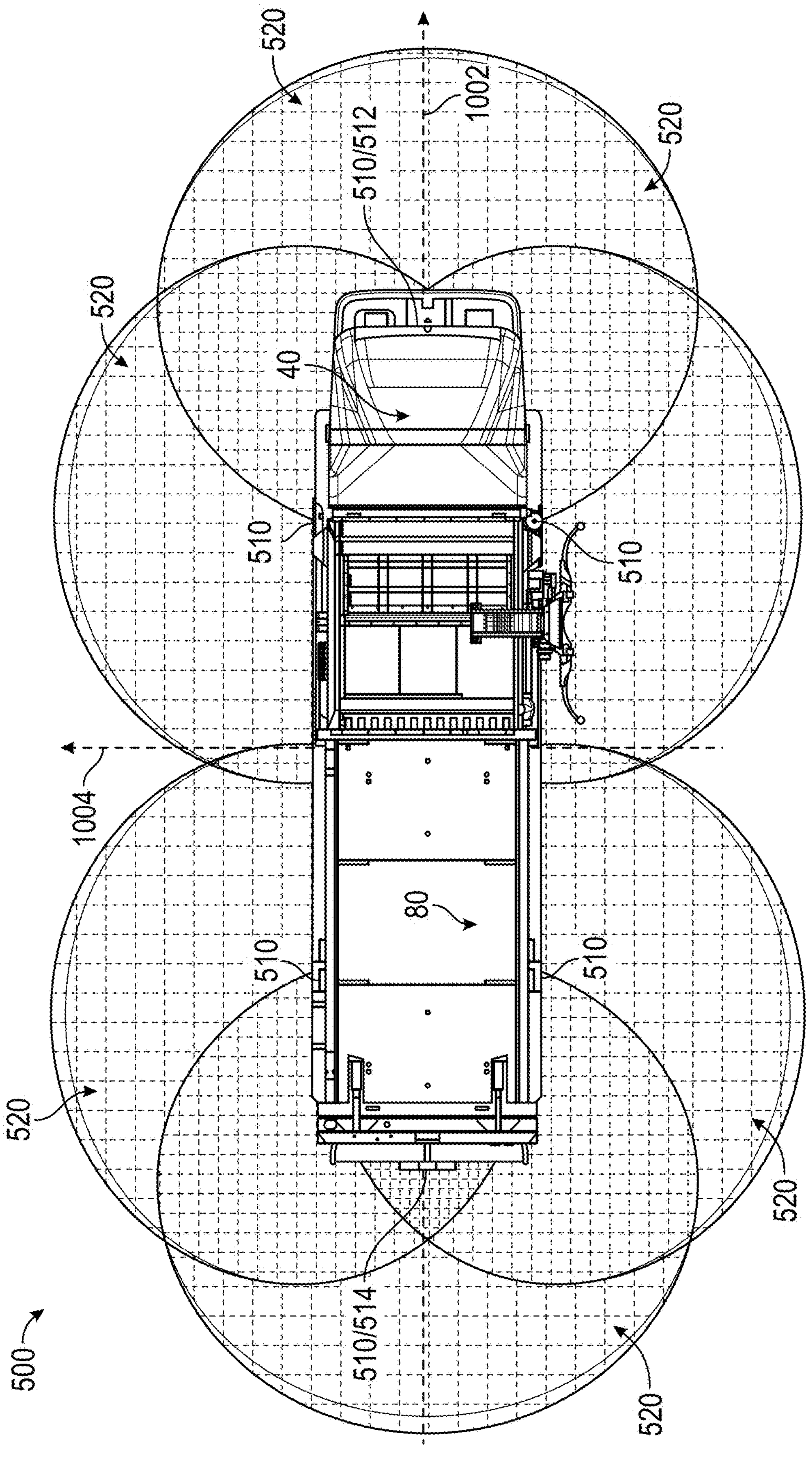
FIG. 14 is a top view of the vehicle of FIG. 1 equipped with an advanced driver-assistance system, including a 360-degree camera system, according to an exemplary embodiment.

According to an exemplary embodiment shown in FIG. 14, an ADAS includes a three hundred and sixty degree (360°) camera system, shown as 360 system 500, integrated into the refuse vehicle 10. The 360° system 500 includes sensors, shown as cameras 510. In some embodiments cameras 510 may be image sensors configured to capture live video and image data and provide the sensor data to ADAS. Cameras 510 have a field of view, shown as camera FOV 520. In some embodiments, camera FOV 520 can be between 100-200 degrees. For example, cameras 510 can have a 160-degree fOV or a 190-degree fOV. The camera FOV 520 of cameras 510 may overlap on the corners to aid in stitching the various feeds together to form a composite 360-degree view of refuse vehicle 10. One or more cameras can monitor a state of the hopper volume 132, or may be coupled to various vehicle portions to avoid or reduce obstructed views. In some embodiments, cameras 510 make up some and/or all of sensors 610 that provide sensor data to a controller included in the ADAS. As shown in FIG. 14, cameras 510 may be integrated into refuse vehicle 10 itself. For example, application kit 80 and/or cab 40 of refuse vehicle 10 may be modified such that integrated cameras 510 are installed into and protected by application kit 80 and/or cab 40 while still able to obtain appropriate image data. The cameras 510 may be disposed at any number of locations throughout and/or around the refuse vehicle 10. While six cameras 510 are shown in FIG. 14, it should be understood that the number and position of cameras 510 in 360° system 500 might vary without departing from the scope of the present invention. In some embodiments, cameras 510 include a front camera 512 and a rear camera 514 as part of 360° system 500. In some embodiments, cameras 510 may be configured to detect an object and/or obstacle in the way of the vehicle 10. The cameras may be in communication with a user interface in the cab 40. The user interface may be configured to provide notifications regarding the object and/or obstacle in the way of the vehicle 10.

Refuse vehicle 10 is shown on a vehicle axis system with an x-axis 1002 and y-axis 1004 that follow the International Organization for Standardization (ISO) Road Vehicles-Vehicle Dynamics and road-holding ability-Vocabulary (ISO Standard No. 8855:2011) Vehicle Axis System 2.10 convention, published December 2012, the entirety of which is herein incorporated by reference. The x-axis 1002 is a horizontal axis parallel to the vehicle's heading and in the forward direction of the vehicle such that it is also parallel to refuse vehicle 10's longitudinal plane of symmetry. The y-axis 1004 is perpendicular to the x-axis 1002 and the refuse vehicle 10's longitudinal plane of symmetry and is in the left direction of the vehicle of refuse vehicle 10.

In some embodiments, the front camera 512 and the rear camera 514 are approximately positioned on the x-axis 1002 and at approximately the same height from the ground as the other cameras 510 such that the cameras all lie in the approximately same z-plane parallel to and above the xy-plane.

Figure 15:
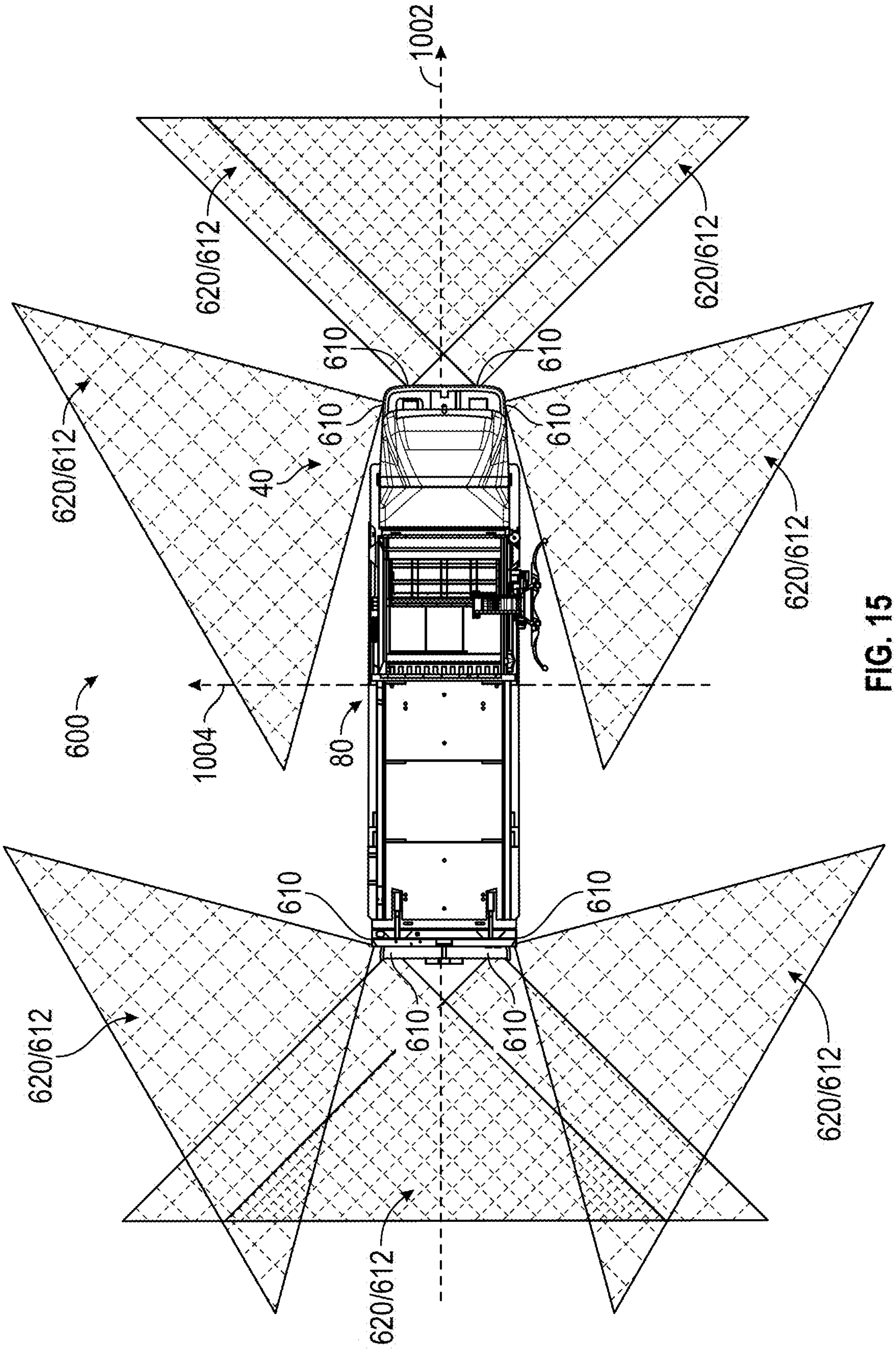
FIG. 15 is a top view of the vehicle of FIG. 1 equipped with an advanced driver-assistance system, including a radar detection system, according to an exemplary embodiment.

According to an exemplary embodiment shown in FIG. 15, ADAS includes a radar detection system, shown as radar system 600, configured to detect the position, speed, direction of travel, and/or acceleration of one or more objects external to refuse vehicle 10. Radar system 600 includes radar sensors, shown as radar sensors 610 integrated into the body of refuse vehicle 10, with field of views, shown as radar FOVs 620. Such integration can include mechanical or electrical coupling, wherein the electrical coupling can employ wired or wireless links. In some embodiments, radar sensors 610 make up some and/or all of sensors 610 that provide sensor data to controller. In some embodiments, radar sensors 610 are dual sensing radar sensors, and may have multiple radar FOVs 620, such as a first FOV for short range sensing, shown in FIG. 15 as short range FOV 612, and a second FOV for long range sensing, shown in FIG. 16 as long range FOV 614. In some embodiments, the short range FOV 612 is wider than the long range FOV 614. For example, the short range FOV 612 can be 45 degrees and the long range FOV 614 can be 20 degrees. Still in other embodiments the radar sensors 610 are single-distance radar sensors and have only a single FOV. In some embodiments, the radar sensors 610 are installed low to the ground (e.g., below an uppermost portion of the chassis 20 or a location of a camera 510) in a substantially horizontal plane parallel to the xy-plane made by the x-axis 1002 and the y-axis 1004. For example, the radar sensors 610 can be placed between 35 and 43 inches off the ground on a horizontal plane. Radar sensors 610 should be placed approximately horizontally to ensure they function properly. Placing radar sensors 610 low to the ground helps radar sensors 610 detect smaller vehicles such as motor cycles and smaller pedestrians. Placing sensors too low can cause collisions or interference (e.g., loss of line-of-sight) with the ground or road debris. Radar sensors 610 can provide sensor data to a controller of the ADAS indicating the existence of objects external to the refuse vehicle 10. The objects can include pedestrians, vehicles, refuse containers, etc. In some embodiments, the sensor data includes a position, direction of travel, speed, and/or acceleration of detected objects and/or obstacles. The sensors 610 may be in communication with a user interface in the cab 40. The user interface may be configured to provide notifications to a user via the user interface in the cab 40 regarding the object and/or obstacle in the way of the vehicle 10.

The controller of the ADAS can detect one or more objects engaged with the refuse vehicle, such as via lift forks 146, grabber fingers 166, or the like. For example, the controller can store one or more predefined shapes, symbols, or other indicia of an object engaged with the refuse vehicle 10. The controller can store an outline or dimension of a refuse bin or dumpster, recognize an object engaged with the refuse vehicle, and determine that the detected object is not an obstacle. Thus a detection thereof may be labeled or masked as a false event. In some embodiments, the controller can receive a position of an element of the refuse vehicle 10, such as the position of the lift forks 146 or grabber fingers 166. The controller can infer a location of an object based on the location thereof. For example, upon an actuation of a front lift fork 146, the controller can mask all or a portion of a FOV of a front facing sensor (e.g., a camera FOV 520, radar FOV 620, or the like). A correlation between the objects (e.g., dumpsters) and the lift assembly may include a determination that the detect object is engaged with or otherwise related to the lift assembly.

According to an exemplary embodiment, radar system 600 includes two radar sensors 610 positioned on the front of cab 40 and positioned to be forward facing. In some embodiments, two radar sensors 610 are positioned on the front corners of cab 40 and positioned outward, with a bias towards facing towards the rear of refuse vehicle 10. In some embodiments, two radar sensors 610 are positioned behind the cab 40 in a lower battery box area. Application kit 80 may also include on or more radar sensors 610. In some embodiments, two radar sensors 610 integrated into the rear of application kit 80 and positioned to face outward are configured to detect obstacles behind the refuse vehicle 10. Still in some embodiments, two radar sensors 610 can be integrated into the rear corners of application kit 80 and positioned to face an approximately 45 degree angle to the radar sensors 610 positioned to face behind the refuse vehicle 10. While certain radar sensors 610 are shown in the configuration described above, it should be understand that the number and position of radar sensors 610 in radar system 600 may vary without department from the scope of the invention. For example, radar system 600 may only include front-facing and rear-facing radar sensors 610.

Figure 16:
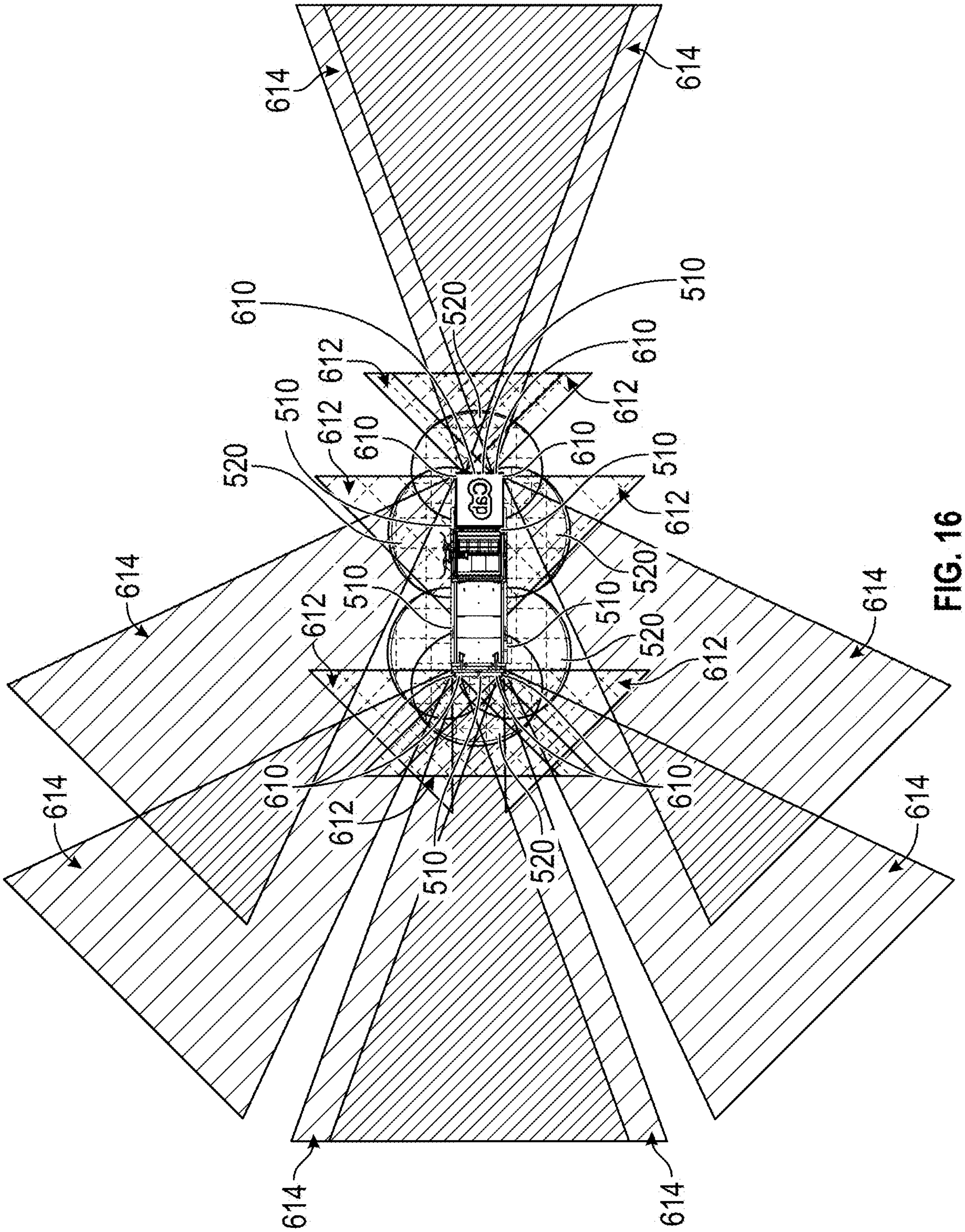
FIG. 16 is a top view of the vehicle of FIG. 1 equipped with an advanced driver-assistance system, including a 360-degree camera system and radar detection system, according to an exemplary embodiment.

As shown in FIG. 16, refuse vehicle 10 may include both 360° system 500 and radar system 600. In some embodiments, a controller of the ADAS receives inputs from both 360° system 500 and radar system 600 and integrates the two inputs into a single composite data model of refuse vehicle 10 and/or its surroundings. Camera FOVs 520 and radar FOVs 620 may overlap. In some embodiments, the vehicle 10 includes a user interface in communication with the integrated 360° system 500 and the radar system 600. In some embodiments, other sensors may be included in the application kit 80 such as LiDAR, Infrared, or the like. The user interface may be configured to display one or more notifications associated with potential collisions with objects and/or obstacles in the path of the vehicle 10. In this way, the integrated system may be configured to provide notifications to a user interface in the cab 40 of the vehicle 10 in the event that a collision is about to occur based on the detection of the 360° system 500, the radar system 600, a combination of the two, or other sensors.

A. Notification Muting

Figure 17:
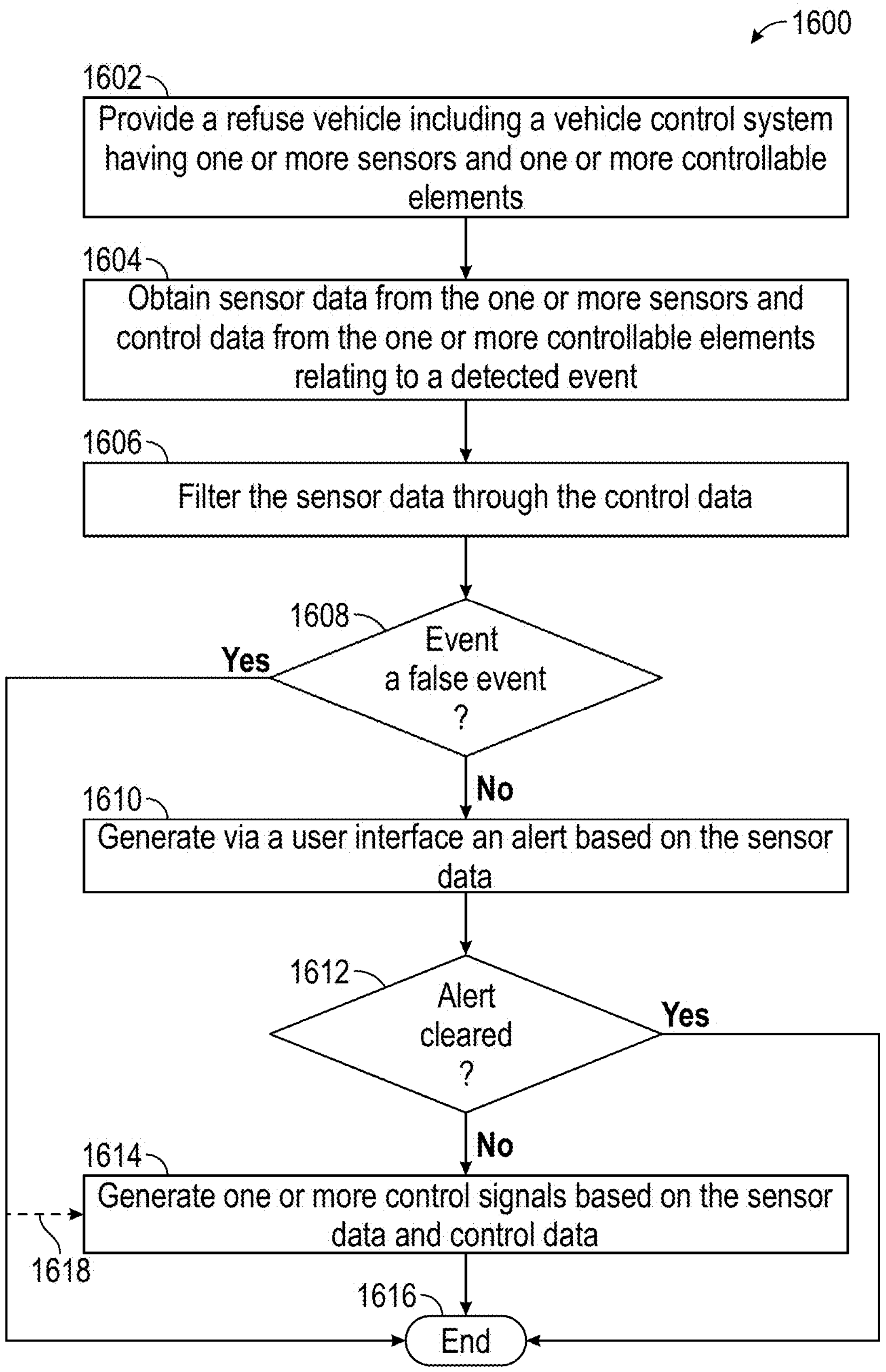
FIG. 17 is a flow diagram of a process for muting notifications regarding obstacles and/or objects in the vicinity of the vehicle of FIG. 1, according to an exemplary embodiment.

Referring now to FIG. 17, a process 1600 for muting (e.g., suppressing) or allowing notifications regarding sensor data is shown, according to an exemplary embodiment. In some embodiments, process 1600 is performed by one or more components of refuse vehicle 10. For example, process 1600 can be performed by the controller of the ADAS.

In some embodiments, process 1600 includes providing a refuse vehicle including an ADAS system having one or more sensors and one or more controllable elements (step 1602). Controllable elements may be the same or similar to the lift assembly 140. Further, controllable elements may include the lift assembly 160, the chute 238, the outriggers 252, the ladder assembly 254, the monitor 264, the monitor 314, the boom assembly 354, and/or the cab 404. It should be appreciated that the controllable elements may further include a prime mover, steering components, power transmission or driver components, braking components, lift assemblies, electric actuators, hydraulic actuators, electric motors, systems, subsystems, assemblies, and/or any other components of refuse vehicle 10 controllable by an operator. In some embodiments, provided sensor can be the same or similar to sensors 610. In some embodiments, the sensors can include 360° system 500, radar system 600, and collision detection system.

In some embodiments, process 1600 includes obtaining data from the one or more sensors and the one or more controllable elements relating to a detected event (step 1604). In some embodiments, the data obtained includes sensor data and/or control data. The sensor data can include image data, proximity data, and or other types of data such as a direction of travel, speed, or acceleration of detected objects. The control data can include the position, direction of movement, speed, and/or acceleration of lift assembly 140 or other vehicle portions. Elements of the control data referring to a current or previous condition of the vehicle 10 can be referred to herein as a state of the vehicle 10. The control data may include a list of past control signals provided to lift assembly 140. In some embodiments, the data is obtained from the one or more sensors in network communication (e.g., via a wired or wireless network). For example, the network can include an Ethernet connection. The sensors may include cameras 510 and radar sensors 610. The sensors can all be connected to the network for transmitting information to a controller. The network may include Ethernet connections employing copper or coax lines (e.g., differential twisted pairs). In some embodiments, the network employs fiber-optic lines. In some embodiments, the detected event is the presence of an obstacle. For example, the cameras 510 may detect the event or the controller may generate the event responsive to image data received by the cameras and conveyed to the controller. Various sensor data relating to the event may be provided to the controller. The controller may provide an indication of the event or information relevant to the event (e.g., a time, direction, speed, or the like) to a user of the lift device via a notification generated by one or more control signals, as discussed in greater detail below in regard to step 1614. In some instances, the detected event is the operation of the lift assembly 140 detected by the sensors (for example, the cameras 510). It may be advantageous to mask a notification in such instances that would otherwise be provided to the user of the lift device that would otherwise be generated. For example, the user may already be aware of lift assembly movements they are controlling. The detected event may be correlated with the control data. For example, the control data can include the data received from one or more controllable elements at the time the sensor data indicated the presence of the obstacle. In some embodiments, the detected event may be based on a user input. For example, the detected event can be a movement of a joystick of the user interface referenced above with regard to FIGS. 14, 15, and 16. In some embodiments, all sensor data is filtered by the corresponding control data. For example, the controller may compare sensor data to control data constantly, or according to a loop or interrupt, to identify where the sensor data includes false events based on the control data instances. Such false events may be correlated with a determination to mask the notification that would otherwise be provided to the user of the lift device. Thus, the false events can include instances of a detection of a portion of a vehicle, such as a lift assembly 140, by a sensor of a vehicle, such that the ADAS provides an indication of an obstacle based on the detection of the portion of the vehicle.

In some embodiments, the lift assembly 140 or other vehicle portion may obscure a detection zone of a sensor (e.g., a field of view of a camera 510) such that the sensor cannot monitor a portion of the vehicle surrounding the refuse vehicle 10. According to some implementations, another sensor of a same or different type may monitor a relevant detection zone. For example, a front loading refuse vehicle 10 raising a refuse container can obscure a FOV of a front facing camera 512 of the refuse vehicle. Another sensor, such as a front facing emitter or sensor 610 of a radar system 610 may monitor the obscured zone. For example, the radar sensor 610 can be mounted lower on the refuse vehicle 10 such that the radar sensor 610, in combination with the front facing camera 512, can continuously monitor the detection zone or a portion thereof. In some implementations, the combination of vehicle sensors may not monitor the detection zone or a portion thereof. For example, the refuse container of the previous example can obscure one or more sensors such that the ADAS can determine that the sensors are blocked by a portion of the refuse vehicle 10, but may not detect an obstacle beyond the refuse container. The controller can determine whether or how to mask a notification based on a determination that the ADAS may not detect an obstacle. For example, the ADAS can delay or fail to mask the notification, partially mask the notification, provide another indication of a non-operation of the ADAS, etc. In some embodiments the controller can determine that a detection zone is unobscured upon a failure of any sensor to detect their respective portion thereof (e.g., to preserve redundancy). In some embodiments, the controller can determine that a detection zone is unobscured upon a failure of every sensor, or a portion of sensors (e.g., to increase ADAS availability).

The controller can mask a notification based on an operational status of the refuse vehicle. An operational status can include a vehicle speed, gear selection, occupancy, brake status, or throttle of the refuse vehicle 10. For example, the controller can mask a notification when the vehicle is stationary, when the brake is applied, or when the a gear selector is placed in park. Like other portions of the present disclosure, the operational status can be employed in combination with aspects provided herein. For example, the controller can determine whether or how to mask a notification based on the operational status in combination with an obscured sensor (e.g., where at least one sensor is obscured and the refuse vehicle is stationary, the controller may mask a notification).

In some embodiments, process 1600 includes filtering the sensor data through the control data (step 1606) for the purpose of muting notifications. The controller may be configured to filter the sensor data through the vehicle control data to identify, remove, and/or tag false events from the sensor data that would otherwise be provided to a user of the vehicle 10 as a notification. False notifications may be instances of sensor data that appear to indicate one or more objects are present around refuse vehicle 10, but actually are due to refuse vehicle 10 itself and/or one or more of its components, or an element interfacing therewith (e.g., a refuse container engaged with lift forks 146 of the refuse vehicle 10). The filter process can include using the control data to identify the position of one or more components of refuse vehicle 10 and comparing that position to the detected object in the sensor data. Sensor data observations that align with control data can be filtered out as false notifications. For example, the cab 40 may interface with the lift assembly 140 in front of refuse vehicle 10. Forward radar can detect lift assembly 140 as an object and provide sensor data to controller indicating the positon, direction of movement, speed, and/or acceleration of the object. Controller can also receive control data indicating that lift assembly 140 is interfaced with the refuse vehicle and the arms of cab 40 are lowered. If the sensor data is not filtered, controller may analyze the sensor data determine an object is present. If the sensor data is filtered through the control data, controller can compare the filter sensor data and the control data and determine the sensor data is a false event due to the lift assembly 140, and that no external object is present. Accordingly, the controller can mask the notification that would otherwise be provided as a detection of an external object.

In some embodiments, process 1600 includes checking if the event is a false event (step 1608). In some embodiments, if a false event is detected, the sensor data the notification is based on may be masked (e.g., removed, tagged, ignored, and/or adjusted by controller). For example, during the filtering process, controller can tag all sensor data that is determined to be due to one or more components of refuse vehicle 10 based on the control data as false event data, and mask (e.g., suppress or append) one or more control signals based on the false event data, therefore muting the notification that would otherwise occur. In some embodiments, if the event is determined to be a false event, the controller masks the notification and the process 1600 proceeds to step 1616 and ends. In other embodiments, if the event is determined to be a false event, the controller partially masks the notification and the process 1600 proceeds to step 1618 as described in greater detail below. In some embodiments, if the event is determined not to be a false event, process 1600 includes proceeding to step 1610.

In some embodiments, process 1600 includes generating, via a user interface, a notification based on the sensor data (step 1610). The notification may be a visual notification via a display (i.e., instrument display, console display) located within the cab 40, and/or an auditory notification via notification a device in the cab 40. The systems and methods herein can employ speakers, bells, air horns, relays, and other audio output devices used in vehicle systems to generate the audible signals. In some embodiments, the notification includes a recommended control action for a user to perform. For example, ADAS via radar system 600 including radar sensors 610 may detect a vehicle in a blind spot of refuse vehicle 10. Controller can generate a notification to a driver indicating the presence of the vehicle. For another example, the refuse vehicle 10 is stopped, and ADAS senses fast approaching objects from the rear of refuse vehicle 10. Controller can generate visual, audible, and/or haptic notifications that are apparent from outside of refuse vehicle 10 and/or the notifications themselves are external refuse vehicle 10 to notification those around refuse vehicle 10 of the approaching objects. In some embodiments, the notifications are audible natural language based notifications. Audible natural language based notifications can explain with language (according to a user preference for example) the content of the notification. For example, the notification may include an audible natural language based notification saying "Vehicle in blind spot." Natural language based notifications allow a user to understand what a notification is for without any other supplemental information. In some embodiments, the notifications can indicate information about refuse vehicle 10. For example, notifications may include a tire pressure of refuse vehicle 10 while operating.

In some embodiments, process 1600 includes checking if the notification is cleared (step 1612). For example, a user may clear a notification via a user input in user interface. Notifications may also be cleared automatically by controller. In some embodiments, controller automatically clears notifications if the underlying event that triggered the notification is no longer detected. For example, a notification of a car in a blind spot of refuse vehicle 10 may persist so long as the car is in the blind spot. Once the car leaves the blind spot, controller may automatically clear the notification. In some embodiments, if the notification is cleared, process 1600 proceeds to step 1616 and ends. In some embodiments, if the notification is not cleared, process 1600 proceeds to step 1614.

In some embodiments, process 1600 includes generating one or more control signals based on the sensor data and control data. Controller can be configured to generate control signals based on the sensor data and control data in response to a true event (i.e., not a false event). Control signals may be commands to operate refuse vehicle 10 and/or one or more components of refuse vehicle 10. For example, sensor data indicate a vehicle ahead of refuse vehicle 10, and control data may indicate refuse vehicle 10 is traveling at a sufficient speed that it will collide with the vehicle if the speed is not diminished. Controller can provide a clearable notification a driver of the vehicle. If the clearable notification is not cleared (i.e., before a time threshold, wherein the time threshold is the point in time determined by controller where action must be taken to avoid a collision), controller can generate control signals to activate the brakes of refuse vehicle 10 and prevent the collision. In some embodiments, the control signals may also control components of refuse vehicle 10 including actuators, motors, lift assemblies, etc. In some embodiments, process 1600 skips steps 1610 and 1612, as described above in regards to muting notifications, and proceeds directly to generating one or more control signals via at 1618. For example, the controller may be configured to provide a visual warning instead of both an audio and visual notification on the user interface in the event that the event is determined to be a false event, rather than muting the notification entirely and proceeding directly to step 1616. In this sense, a notification that is determined to be a false event may be partially masked to be less obtrusive to a user of the vehicle 10, while also providing awareness via the visual aspect of the notification. In other embodiments, Controller can be configured to automatically generate one or more control signals in emergencies where there is not enough time to generate a notification and wait for the clearable notification to be cleared. For example, controller may determine that a control action such as emergency braking should be taken immediately in order to avoid an accident. In some embodiments, after generating the control signals process 1600 proceeds to step 1616 and ends.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A system comprising:
- a vehicle comprising:
  - a chassis;
  - a body assembly coupled to the chassis;
  - a prime mover configured to generate mechanical energy to drive the vehicle; and
  - a lift assembly; and
- a vehicle control system comprising a sensor integrated into the body assembly, the vehicle control system is configured to:
  - receive sensor data from the sensor, the sensor data indicating a potential event;
  - generate a notification associated with the potential event;
  - receive control data indicating a state of the vehicle;
  - filter the sensor data through the control data to determine if the potential event is a false event associated with the state of the vehicle or a true event associated with an external source;
  - initiate a control action in response to the potential event, wherein the control action provides the notification to a user of the vehicle responsive to a determination that the potential event is the true event; and
  - mask the notification in response to a determination that the potential event is the false event, wherein to mask the notification, the vehicle control system is configured to:
    - mask an audible output of the notification; and
    - maintain a visual output of the notification.

2. The system of claim 1, wherein the sensor data comprises an indication of a portion of the vehicle undergoing displacement relative to the chassis and an object external to the vehicle, and wherein the vehicle control system is configured to:
- determine a correlation between the object external to the vehicle with the portion of the vehicle undergoing displacement; and
- mask the notification responsive to the determination of the correlation.

3. The system of claim 1, wherein the sensor includes:
- a radar system comprising a radar sensor; and
- a camera system comprising at least one forward facing camera disposed vertically above the radar sensor.

4. The system of claim 3, wherein each sensor is in network communication with a user interface comprising an audio output device disposed in a cab of the vehicle.

5. The system of claim 1, wherein the vehicle control system is configured to predict the potential event based on a position, direction of travel, and speed of a detected object.

6. The system of claim 1, wherein the control data comprises an indication of a movement or a position of the lift assembly.

7. A method, comprising:
- receiving, by a vehicle control system, sensor data indicating a potential event from a sensor, wherein the sensor is integrated into a body assembly coupled to a chassis of a vehicle comprising:
  - a prime mover configured to generate mechanical energy to drive the vehicle; and
  - a lift assembly;
- generating, by the vehicle control system, a notification associated with the potential event;
- receiving, by the vehicle control system, control data indicating a state of the vehicle;
- filtering, by the vehicle control system, the sensor data through the control data to determine if the potential event is a false event associated with the state of the vehicle or a true event associated with an external source; and
  - masking, by the vehicle control system, the notification in response to a determination that the potential event is the false event by:
  - masking an audible output of the notification; and
  - maintaining a visual output of the notification.

8. The method of claim 7, further comprising:
- determining a correlation between an object external to the vehicle with a portion of the vehicle undergoing displacement;
- masking the notification responsive to the determination of the correlation, wherein the sensor data comprises an indication of the portion of the vehicle undergoing displacement relative to the chassis; and
- the sensor data comprises an indication of the object external to the vehicle.

9. The method of claim 7, wherein the sensor includes:
- a radar system comprising a radar sensor; and
- a camera system comprising at least one forward facing camera disposed vertically above the radar sensor.

10. The method of claim 9, wherein each sensor is in network communication with a user interface comprising an audio output device disposed in a cab of the vehicle.

11. The method of claim 7, wherein the potential event is predicted based on a position, direction of travel, and speed of a detected object.

12. The method of claim 7, wherein the control data comprises an indication of a movement or a position of the lift assembly.

13. A non-transitory computer-readable media, comprising instructions stored thereon that, when executed by one or more processors, cause the one or more processors to:

receive sensor data indicating a potential event from a sensor;

generate a notification associated with the potential event;

receive control data indicating a state of a vehicle;

filter the sensor data through the control data to determine if the potential event is a false event associated with the state of the vehicle or a true event associated with an external source;

initiate a control action in response to the potential event, wherein the control action provides the notification to a user of the vehicle responsive to a determination that the potential event is the true event; and mask the notification in response to a determination that the potential event is the false event, wherein, to mask the notification, the instructions cause the one or more processors to:

mask an audible output of the notification; and maintain a visual output of the notification.

14. The computer-readable media of claim 13, wherein the instructions include instructions to:

determine a correlation between an object external to the vehicle with a portion of the vehicle undergoing displacement; and mask the notification responsive to the determination of the correlation, wherein:

the sensor data comprises an indication of the portion of the vehicle undergoing displacement relative to a chassis of the vehicle; and the sensor data comprises an indication of the object external to the vehicle.

15. The computer-readable media of claim 13, wherein the sensor includes:

a radar system comprising a radar sensor; and a camera system comprising at least one forward facing camera disposed vertically above the radar sensor.

16. The computer-readable media of claim 13, wherein the instructions cause the one or more processors to predict the potential event based on a position, direction of travel, and speed of a detected object.

17. The computer-readable media of claim 13, wherein the control data comprises an indication of a movement or a position of a lift assembly of the vehicle.

* * * * *